Jan. 19, 1954
S. WEIDMANN
2,666,891
OSCILLOGRAPHIC POLAROGRAPH
Filed Sept. 17, 1946
2 Sheets-Sheet 1
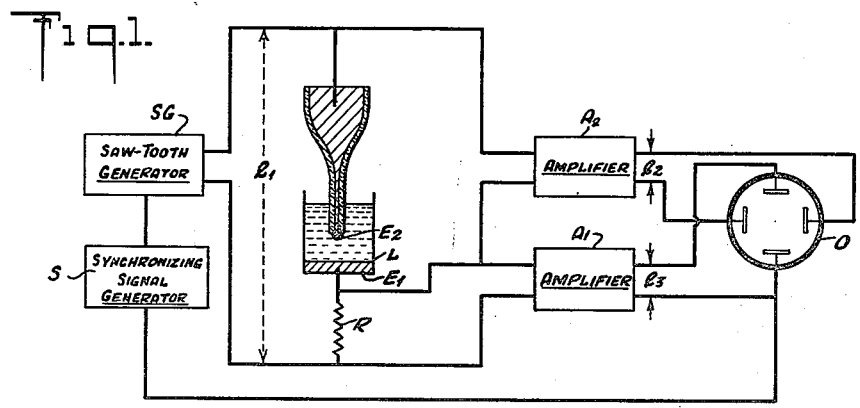
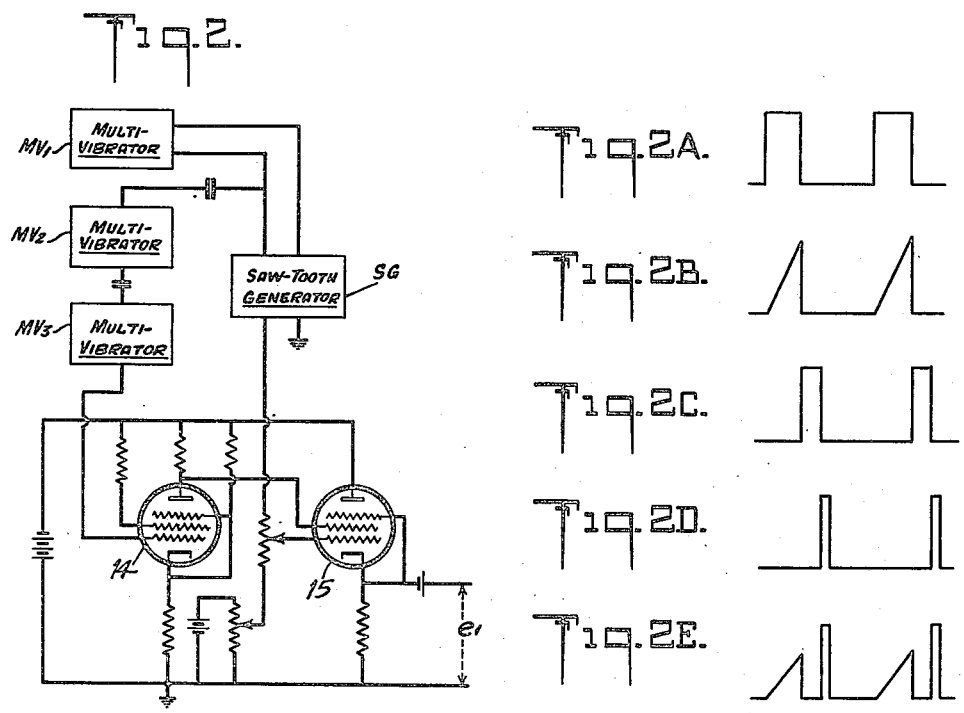
INVENTOR
SILVIO WEIDMANN
BY
ATTORNEY

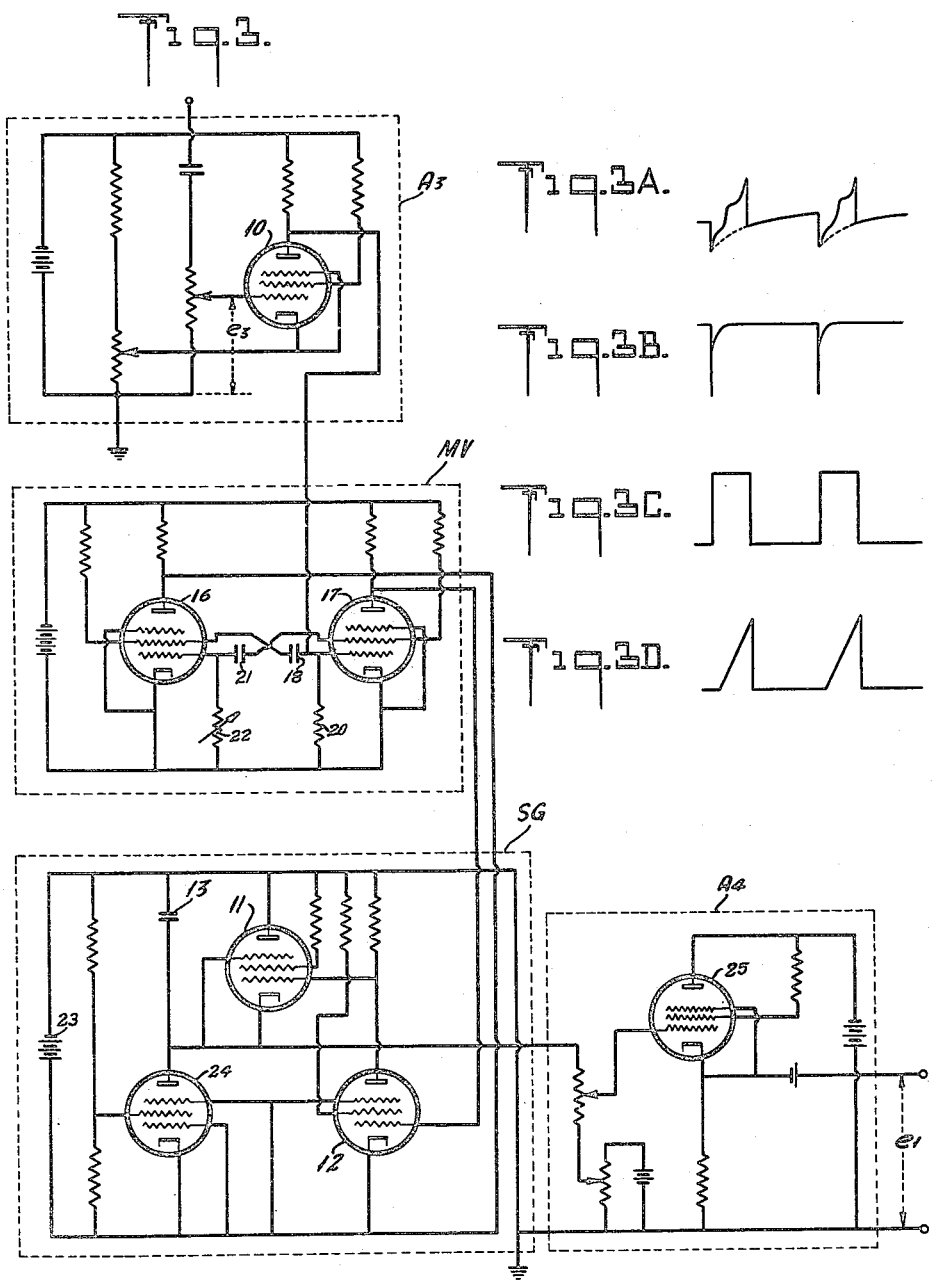

Patented Jan. 19, 1954

2,666,891

UNITED STATES PATENT OFFICE 2,666,891

OSCILLOGRAPHIC POLAROGRAPH

Silvio Weidmann, Bern, Switzerland, assignor, by mesne assignments, to Radio Patents Company, a partnership Application September 17, 1946, Serial No. 697,583

18 Claims. (Cl. 324—31)

The present invention relates to polarographs used for analyzing electrolytic solutions and based on the interpretation of the current-voltage curves obtained during electrolysis. By means of this electrolytical technique, ions and certain other substances can be determined both qualitatively and quantitatively.

In the construction and operation of devices of this type, use is made of the fact that any electrolytic reduction takes place at the predetermined critical electric potential characteristic for each particular ion or substance. If the voltage applied to the electrode is less than the critical value, no current will flow through the electrolyte. If, on the other hand, the impressed voltage exceeds the predetermined or critical value, the intensity of the resulting current will be determined by the number of ions or molecules dissolved or deposited upon the electrode. From a current-voltage curve or diagram, plotted by means of a gradually increasing or time sweep voltage, conclusions may be drawn upon the composition of the electrolyte solution.

In the practical construction of polarographic apparatus, the anode usually takes the form of mercury layer upon the bottom of a vessel containing the electrolyte to be analyzed, while the cathode of the electrolysis cell is formed by a so-called dropping electrode spaced from said anode and comprising a capillary tube through which small mercury droplets are periodically discharged to provide a fresh cathode surface continuously and to prevent the effects of polarization from interfering with the proper functioning of the device.

A polarogram or current-voltage diagram obtained in this manner is characterized by a number of successive steps, the position of which along the voltage axis indicates the particular ion or substance, while the heights of the steps provide a measure of the degree of concentration.

More particularly, the present invention is concerned with a direct reading automatic polarograph utilizing a cathode ray oscilloscope as an indicator to increase both the sensitivity and speed of operation in producing a record for a given solution.

The more specific objects and novel aspects of the invention will become more apparent from the following detailed description taken in reference to the accompanying drawing forming part of this specification and wherein:

Figure 1 is a block diagram showing the basic lay-out of a polarographic system constructed in accordance with the principle of the invention;

Figure 2 is a more detailed circuit diagram showing a system for synchronizing the sweep voltage for the polarograph with the discharge frequency of the mercury dropping electrode;

Figures 2A to 2E are theoretical diagrams explanatory of the function of Figure 2;

Figure 3 shows an alternative and modified system of maintaining the operating sweep voltage of the polarograph in synchronism with the mercury dropping frequency; and Figures 3A to 3D are theoretical diagrams explanatory of the function and operation of Figure 3.

Like reference characters identify like parts in the different views of the drawing.

Figure 1 shows the principal arrangement of an oscillographic type of a polarograph according to the invention. The solution to be analyzed is contained in an electrolytic cell L. To the two electrodes $E_1$ and $E_2$ of the cell, one of which ($E_2$) consists of the surface of a tiny mercury drop while the other ($E_1$) is formed by a layer of mercury at the bottom of the cell, there is impressed a saw-tooth or sweep voltage $e_1$. The electrolytic current through the cell causes a voltage drop across the resistor R, which, after sufficient amplification by means of amplifier $A_1$ controls the vertical deflection of the electron beam of a cathode ray tube or oscilloscope O. The horizontal deflection of the electron beam is proportional to the voltage applied to the cell. For this purpose, the voltage across the electrodes $E_1$ and $E_2$ is applied to the vertical deflecting means of the oscilloscope such as a pair of electrostatic deflecting plates by way of amplifier $A_2$. Accordingly, in the course of each single sweep, the electrolytic current will be plotted against the voltage applied, and the curve produced on the screen of the oscilloscope will deliver an analysis of the solution, in the form of a well known polarogram.

In an arrangement of this type, difficulties result from the fact that the current observed is not an exclusive function of the voltage applied, but varies also with the surface of the mercury drop. In order to get well reproduceable traces on the oscilloscope, it is proposed according to the present invention to establish some sort of synchronism between the course of the sweep frequency and the dropping frequency of the mercury electrode.

Principally, there are two different ways to achieve this synchronisation. According to one modification, an impulse generated by the sweep circuit is utilized to release the mercury drop before it would have done so spontaneously. Alternatively, the course of the sweep voltage may be controlled by a signal, which originates from the release of a drop at the mercury electrode $E_2$.

Figure 1 shows the principal arrangement according to the latter method with the sweep voltage $e_1$ of a saw-tooth generator SG being synchronized with the mercury dropping frequency by means of synchronizing pulses derived from the vertical deflecting voltage $e_3$ of the oscilloscope O and produced in a converter or signal generator S. During the time, when the drop surface increases, a certain slowly increasing amount of current will pass through the cell, whereas at the moment, when the mercury drops into the solution, a pulse or sudden change in current will occur. By means of an electric circuit, which will be discussed later, this pulse is transformed in a suitable manner to initiate a single sweep voltage rise in the sweep circuit by each of the successively released mercury drops.

A synchronized sweep voltage generator circuit of this type comprising both elements S and SG of Figure 1 is shown in greater detail in Figure 3. The voltage $e_3$ between the vertical deflection plates varies principally as shown by the curve, Figure 3A, the dotted line indicating the part of the total current, which is a function of surface increase of the mercury drops, while the stepped curve represents the well known shape of the polarogram indicating the composition of the special electrolyte being investigated. This pulsing voltage $e_3$ is applied to the grid of a vacuum tube 10 forming part of a clipper amplifier $A_3$ and whose steady grid bias is at such a negative value that a plate current will only flow during release of a mercury drop by electrode $E_2$. The thus obtained negative pulses at the anode of the tube 10, as shown in Figure 3B serve to synchronize the square wave, Figure 3C, of a multivibrator circuit MV of known construction, which in turn serves to control or operate the sweep voltage or saw-tooth generator SG.

More particularly, the multivibrator or square wave generator MV comprises in a known manner a pair of electron amplifier tubes 16 and 17 connected to form a two-stage resistance coupled amplifier with the output of the second stage coupled to the input of the first stage. The coupling network between the stages is comprised of a coupling capacitor 18 and a grid coupling resistor 20, while the return coupling comprises a capacitor 21 and variable coupling resistor 22. In the example shown, the multivibrator circuit is connected to the cathodes, control grids and screen grids of the tubes 16 and 17 and is electronically coupled with the plate or output circuit, in a manner readily understood. In order to adjust the frequency of the square wave oscillations, Figure 3C, the return coupling resistor 22 is shown to be variable, while the synchronization with the mercury dropping frequency, Figure 3B, is effected by controlling the grid bias of tube 17 in accordance with the output voltage of the clipper amplifier 10 which is directly applied to the control grid of tube 17, in the manner shown.

The saw-tooth generator SG, in the example shown, comprises a first amplifier tube 12 having its input grid connected to the output of the multivibrator MV and having its anode directly connected to the input grid of a second amplifier tube 11, whose cathode-anode path is shunted by a capacitor 13. The latter is connected to a battery 23, which also serves as a space current supply source for the tubes, through the cathode-anode path of a pentode 24. The latter serves as a constant current device for linearizing the voltage sweep in a manner well understood. The operation of this saw-tooth generator is further described in the following.

For the duration of the one extreme value of the multivibrator voltage, the voltage across the plates of condenser 13 cannot rise, as the grid of tube 12 has a considerable negative bias, and the grid of tube 11 is highly positive. Tube 11 will accordingly represent a short-circuit across the capacitor 13. For the duration of the second extreme value of the multivibrator voltage, the grid of tube 11 will become negative, whereby to represent a high impedance across the capacitor 13, thus allowing the voltage across the capacitor 13 to rise so as to initiate a voltage sweep at the instant of release of a mercury drop.

The sweep voltage derived from the capacitor 13 is further amplified by means of the amplifier $A_4$ comprising a single stage 25 arranged in cathode follower connection in the example illustrated and supplying the final output sweep voltage $e_1$ suitable for application to the input of the polarograph circuit shown in Figure 1.

By inserting a delay circuit between the multivibrator MV and tube 10, it is possible to obtain a polarographic analysis within any phase of growth of the mercury drop. The function of the delay circuit may also be performed by another multivibrator. Taking the polarogram at some later moment during the dropping period has the advantage that unwanted current changes, which are part of the total current observed, are kept at a relatively low rate.

The second possibility to establish synchronization is based on the principle that the surface tension of a mercury drop in an electrolytic solution is lowered, when the voltage applied takes extremely negative or positive values. By using a short voltage pulse at a definite interval from the time sweep, the release of the mercury drop may therefore be caused to occur at a desired instant in respect to the voltage sweep cycle.

A synchronizing arrangement of this type is shown in Figures 2 and 2A to 2E. In the latter, a first multivibrator $MV_1$ delivers an output voltage according to Figure 2A. At the moment when the rapid voltage change occurs, a second multivibrator $MV_2$ is controlled through a small capacitor. The time-constants of the second multivibrator $MV_2$ are given such values that a curve according to Figure 2C results. If the same principle is applied again, the output voltage of a third multivibrator $MV_3$ will be found as in Figure 2D. The first multivibrator $MV_1$, besides controlling the second multivibrator $MV_2$, also serves to control the sweep circuit SG in the same way as explained above. Curves according to Figure 2B and Figure 2D are then added electrically by means of the tubes 14 and 15, so that the course of the voltage $e_1$ across the cathode resistor of the tube 15 will be as shown in Figure 2E. The tube 14 acts as an amplifier for the output voltage of the multivibrator $MV_3$, Figure 2D, and is shown directly coupled to the second control grid of tube 15, whose first control grid is excited by the output voltage of the saw-tooth generator SG, whereby to effect an additive combination of the saw-tooth and pulse voltages according to Figures 2B and 2D and to produce a final composite output voltage $e_1$, Figure 4E, suitable to be applied to the input of the polarograph in the manner shown in Figure 1. During the relatively slow voltage-rise originating from the sweep circuit, the polarographic curve is traced, while the following short pulse serves to cause the release of the mercury drop. While the electrolysis cell is excited by a composite sweep voltage according to Figure 2E, the horizontal deflecting plates of the oscillograph O may be excited by the simple sweep voltage according to Figure 2B.

The two methods for synchronization described above result in another advantage of the invention as pointed out in the following.

Although working with a sweep-to-drop ratio of 1:1, the duration of a single sweep can be made short relative to the time, which is needed for a mercury drop to grow. By keeping the increase of electrode surface during one sweep cycle at a low rate, unwanted current changes are minimized.

While there have been shown and described a few desirable embodiments of the invention, it is understood that various changes in shape, arrangements of parts as well as the substitution of equivalent elements and circuits for those herein shown, may be made without departing from the spirit and scope of the invention as defined in the appended claims. The specification and drawing are accordingly to be regarded in an illustrative rather than a limiting sense.

I claim:

1. A polarograph comprising an electrolytic cell including a dropping electrode, a source of periodic sweep voltage connected to said cell, a cathode ray oscillograph having a pair of coordinate deflecting means, means for applying deflecting energy to one of said deflecting means varying in proportion to the current through said cell, to correspondingly deflect the cathode ray of said oscillograph in one coordinate direction, further means for applying voltage from said source to the other of said deflecting means, to deflect the cathode ray in the other coordinate direction, a multivibrator, means for synchronizing said multivibrator with the current impulses through said cell incident to the release of a mercury drop, and further means for maintaining said sweep voltage in synchronism with the multivibrator frequency.

2. A polarograph comprising an electrolytic cell including a dropping electrode, a cathode ray oscillograph having a pair of coordinate deflecting means, a source of periodic saw-tooth voltage connected to one of said deflecting means, means operatively connected to said source for producing a further composite wave comprising saw-tooth voltage sweeps separated by relatively short voltage peaks preceding each sweep by a constant time interval, means for applying said composite voltage wave to said electrolytic cell, and means for producing deflecting potential for the other of said deflecting means and being proportional to the current through said cell.

3. A polarograph comprising an electrolytic cell including a dropping electrode, a cathode ray oscillograph having two pairs of electrostatic deflecting plates oriented at right angles to each other, a source of periodic sweep voltage connected to said horizontal deflecting plates, further means connected to said source for producing a composite wave comprising saw-tooth voltage sweeps separated by relatively short voltage peaks preceding each sweep by a constant time interval, a load resistance, means for applying said composite voltage wave to said cell in series with said load resistance, and means for applying vertical deflecting voltage from said load resistance to said cathode ray tube.

4. A polarograph comprising an electrolytic cell including a dropping electrode, a source of periodic sweep voltage connected to said cell, a cathode ray oscillograph having a pair of coordinated deflecting means, means for applying deflecting energy to one of said deflecting means varying in accordance with the current through said cell to deflect the cathode ray in one of the coordinate directions, further means for applying deflecting energy from said source to the other of said deflecting means to deflect the cathode ray in the coordinate direction, a clipping circuit connected to said first mentioned deflecting means for producing voltage peaks incident to the release of a drop by said dropping electrode, a multivibrator with means for synchronizing the same by said voltage peaks, and means for synchronizing said source of sweep voltage by said multivibrator.

5. A polarograph comprising an electrolytic cell having a dropping electrode, a source of periodic sweep voltage connected to said cell, a cathode ray oscillograph having a pair of coordinate deflecting means, means for applying deflecting energy to one of said deflecting means varying in proportion to the current through said cell, to correspondingly deflect the cathode ray in one coordinate direction, further means for applying sweep voltage from said source to the other of said deflecting means, to deflect the cathode ray in the other coordinate direction, means for deriving periodic pulses from said current incident to the release of successive drops by said electrode and having a repetition frequency equal to the spontaneous dropping frequency of said electrode, and further means for synchronizing said sweep voltage by said current pulses.

6. A polarograph comprising an electrolytic cell having a dropping electrode, a source of periodic sweep voltage and a load resistance electrically connected to form a series circuit, a cathode ray oscillograph having a pair of electrostatic deflecting means, means for applying deflecting voltage derived from said resistance to one of said deflecting means, to correspondingly deflect the cathode ray in one coordinate direction, further means for applying sweep voltage from said source to the other of said deflecting means, to deflect the cathode ray in the other coordinate direction, means for deriving periodic voltage pulses from said circuit incident to the release of successive drops by said electrode and having a repetition frequency equal to the spontaneous dropping frequency of said electrode, and further means for synchronizing said sweep voltage by said voltage pulses.

7. A polarograph comprising an electrolytic cell having a dropping electrode, a source of periodic sweep voltage and a load resistance electrically connected to form a series circuit, a cathode ray oscillograph having a pair of electrostatic deflecting means, means for applying voltage drop developed by said resistance to one of said deflecting means, to correspondingly deflect the cathode ray in one coordinate direction, further means for applying voltage drop developed by said cell to the other deflecting means, to deflect the cathode ray in the other coordinate direction, means for deriving periodic voltage pulses from said circuit incident to the release of successive drops by said electrode and having a repetition frequency equal to the spontaneous dropping frequency of said electrode, and further means for synchronizing said sweep voltage by said pulses.

8. A polarograph comprising an electrolytic cell having a dropping electrode, a source of periodic sweep voltage connected to said cell, a cathode ray oscillograph having a pair of coordinate deflecting means, means for applying deflecting energy to one of said deflecting means varying in proportion to the current passing through said cell, to correspondingly deflect the cathode ray in one coordinate direction, further means for applying sweep voltage from said source to the other deflecting means, to deflect the cathode ray in the other coordinate direction, a pulse voltage generator, means for synchronizing said generator by the current pulses through said cell incident to the release of successive drops by said electrode and having a repetition frequency equal to the spontaneous dropping frequency of said electrode, and further means for maintaining said sweep voltage in synchronism with said pulse generator.

9. A polarograph comprising an electrolytic cell having a dropping electrode, a source of periodic saw-tooth sweep voltage connected to said cell, a cathode ray oscillograph having a pair of coordinate electrostatic deflecting means, means for applying deflecting voltage to one of said deflecting means varying in proportion to the current passing through said cell, to correspondingly deflect the cathode ray in one coordinate direction, further means for applying voltage drop developed by said cell to the other deflecting means, to deflect the cathode ray in the other coordinate direction, a pulse voltage generator, means for synchronizing said generator by the current pulses incident to the release of successive drops by said electrode and having a repetition frequency equal to the spontaneous dropping frequency of said electrode, and further means for maintaining said sweep voltage in synchronism with said pulse generator.

10. A polarograph comprising an electrolytic cell having a dropping electrode, a source of periodic sweep voltage connected to said cell, a cathode ray oscillograph having a pair of coordinate deflecting means, means for applying deflecting energy to one of said deflecting means varying in proportion to the current passing through said cell, to correspondingly deflect the cathode ray in one coordinate direction, further means for applying sweep voltage from said source to the other deflecting means, to deflect the cathode ray in the other coordinate direction, a clipping circuit connected to said cell for deriving periodic voltage pulses incident to the release of successive drops of said electrode and having a repetition frequency equal to the spontaneous dropping frequency of said electrode, and means for synchronizing said sweep voltage by said voltage pulses.

11. A polarograph comprising an electrolytic cell having a dropping electrode, a source of periodic saw-tooth sweep voltage connected to said cell having sweep cycle being small compared with the spontaneous dropping cycles of said electrode, a cathode ray oscillograph having a pair of coordinate deflecting means, means for applying deflecting energy to one of said deflecting means varying in proportion to the current passing through said cell, further means for exciting the other of said deflecting means by energy derived from said source, means for deriving periodic pulses from said current incident to the release of successive drops by said electrode and having a repetition frequency equal to the spontaneous dropping frequency of said electrode, and further means for synchronizing said sweep voltage by said current pulses.

12. In combination, an electrolytic cell having means for forming an electrode surface within a liquid, a voltage generator adapted to generate a voltage wave that varies instantaneously as a predetermined function of time elapsed from the instant operation of said voltage generator is initiated, means controlled in response to a change in a characteristic of said electrolytic cell during the period of formation of said electrode surface for initiating the operation of said voltage generator, means for applying the generated voltage across said electrode surface during the formation thereof, and means for indicating a variation of a characteristic of said cell as a function of the voltage applied across said electrode surface.

13. In combination, a testing device having a pair of electrodes arranged to contact a mixture under test, said device having a first characteristic which varies periodically independently of the voltage applied to said electrodes and a second characteristic which varies as a function of a voltage applied to said electrodes in accordance with the composition of a mixture contacted and also as a function of the first characteristic, a voltage generator adapted upon operation to generate a voltage wave having an instantaneous voltage amplitude that varies as a predetermined function of time elapsed after its operation is initiated, means responsive to a periodic change in the first characteristic of said device for periodically initiating the operation of said voltage generator in timed relation to such a periodic change, means for applying a voltage wave periodically generated by said voltage generator to said device, whereby the second characteristic of said device varies as a function of the voltage applied thereto solely in accordance with the composition of the mixture under test, and means for detecting a change periodically occurring in the second characteristic of said device as a result of the application of said periodic voltage wave.

14. In combination, an electrolytic cell having an electrode formed by a body of fluid having a limited portion thereof in contact with a second fluid, said limited portion of the electrode surface being periodically renewed in a substantially uniform manner, a voltage generator adapted upon operation to generate a voltage wave that varies instantaneously as a predetermined function of time elapsed from the instant operation thereof is initiated, means periodically controlled in response to a periodic change occurring in said electrolytic cell synchronously with the periodic renewal of said limited portion of the electrode surface for periodically initiating the operation of said voltage generator in timed relation to said periodic change in said electrolytic cell, whereby a voltage wave is generated in timed relation to each said change occurring in said electrolytic cell, means for effectively applying the periodically generated voltage wave across said limited portion of the electrode surface, and means for detecting a change occurring in said cell as a function of the voltage applied across said limited portion of said electrode surface.

15. In combination, an electrolytic cell having an electrode formed by an electrically conducting liquid having an exposed surface immersed in a second electrically conducting liquid, the exposed surface periodically enlarging and forming drops that break off from the main body of said conducting liquid thereby periodically renewing the exposed surface, a voltage generator adapted upon operation to generate a voltage wave that varies instantaneously as a predetermined function of time elapsed from the instant operation thereof is initiated, means for applying a voltage wave generated by said voltage generator across said exposed surface, means controlled in response to the breaking off of a drop from the main body of said conducting liquid for initiating the operation of said voltage generator in predetermined timed relation with respect to the renewal of said exposed surface, and means for detecting a change in the current flowing across the renewed exposed surface as a function of the instantaneous voltage applied thereacross.

16. Apparatus for displaying polarograms on a cathode ray tube, comprising a polarographic cell with dropping mercury electrode, means for applying a recurring linear potential sweep to said polarographic cell, means actuated by the polarographic cell for causing said linear potential sweep to carry out a predetermined excursion within a small portion of the electrode drop-forming time towards the end thereof, and means for applying potentials proportional to the voltage developed across and to the current passing through the polarographic cell, to the X and Y deflector plates respectively, of a cathode ray tube.

17. Apparatus for displaying polarograms on a cathode ray tube, comprising a polarographic cell with periodically renewable dropping mercury electrode, means for applying a recurring linear potential sweep to said polarographic cell, means actuated by said cell for causing the linear potential sweep to carry out a predetermined excursion during an interval less than the interval required for a drop to form and release, and means for applying potentials proportional to the voltage developed across the cell and the current passing through the same, to the X and Y deflector plates respectively of a cathode ray tube.

18. Apparatus for displaying polarograms on a cathode ray tube, comprising a polarographic cell with dropping mercury electrode, means for applying a recurring linear potential sweep to said cell, adjustable synchronizing means actuated by the said cell for applying the said recurring linear potential sweep to said cell during an interval less than the interval required for a drop to form and release, and means for amplifying the voltage developed across the cell and the current passing through the same and for applying the resultant potentials to the X and Y deflector plates respectively, of the cathode ray tube.

SILVIO WEIDMANN.

References Cited in the file of this patent

UNITED STATES PATENTS

| Number | Name | Date |
|---|---|---|
| 2,246,981 | Matheson et al. | June 24, 1941 |
| 2,343,885 | Coleman | Mar. 14, 1944 |
| 2,361,295 | Kanner et al. | Oct. 24, 1944 |